US008430373B2

(12) United States Patent
Nishi et al.

(10) Patent No.: US 8,430,373 B2
(45) Date of Patent: Apr. 30, 2013

(54) FLUID-FILLED TYPE VIBRATION DAMPING DEVICE

(75) Inventors: Naoki Nishi, Nagoya (JP); Daisuke Fukunaga, Wako (JP); Tetsuya Miyahara, Wako (JP); Keisuke Kawabe, Wako (JP)

(73) Assignees: Tokai Rubber Industries, Ltd., Komaki (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/025,812

(22) Filed: Feb. 11, 2011

(65) Prior Publication Data

US 2011/0210230 A1 Sep. 1, 2011

(30) Foreign Application Priority Data

Feb. 26, 2010 (JP) ................... 2010-043404

(51) Int. Cl.
*F16M 13/00* (2006.01)
(52) U.S. Cl.
USPC ........... 248/562; 248/636; 248/566; 248/638; 267/140.13; 267/219
(58) Field of Classification Search .................. 248/638, 248/636, 562, 631, 566, 559, 560
See application file for complete search history.

(56) References Cited

U.S. PATENT DOCUMENTS

| 5,433,421 | A | * | 7/1995 | Ishiyama | 267/140.13 |
| 5,499,799 | A | * | 3/1996 | Kojima | 267/140.13 |
| 5,906,360 | A | * | 5/1999 | Kanda | 267/140.12 |
| 6,145,802 | A | * | 11/2000 | Nakagaki et al. | 267/140.14 |
| 6,352,249 | B2 | * | 3/2002 | Muramatsu et al. | 267/140.14 |
| 6,910,683 | B2 | * | 6/2005 | Itoh et al. | 267/140.13 |
| 7,044,674 | B2 | * | 5/2006 | Dixon et al. | 401/205 |
| 7,210,674 | B2 | * | 5/2007 | Maeno et al. | 267/140.13 |
| 7,314,213 | B2 | * | 1/2008 | Tanaka | 267/140.5 |
| 7,458,565 | B2 | * | 12/2008 | Miyahara | 267/140.11 |
| 7,780,154 | B2 | * | 8/2010 | Katagiri et al. | 267/140.13 |

(Continued)

FOREIGN PATENT DOCUMENTS

| JP | A-06-234134 | 8/1994 |
| JP | A-2001-050331 | 2/2001 |
| JP | A-2008-248930 | 10/2008 |

OTHER PUBLICATIONS

Chinese Office Action dated Nov. 5, 2012 for Chinese Patent Application No. 201110047125.6 (with translation).

*Primary Examiner* — Terrell McKinnon
*Assistant Examiner* — Monica Millner
(74) *Attorney, Agent, or Firm* — Oliff & Berridge, PLC (57) ABSTRACT

A fluid-filled type vibration damping device including a resin bracket provided on an outside peripheral face of a second mounting member. The resin bracket includes a mating portion mated within a mating groove of the second mounting member opening in an outside peripheral face of the second mounting member, a mating tubular portion extending on the outside peripheral face of the second mounting member from the mating portion to one axial side, and a mounting portion which is formed at a distal end portion of the mating tubular portion on the one axial side and extends peripherally outward. A weight reducing space opens at a distal end face of the mating tubular portion on the one axial side while extending between an inside peripheral face of the mating tubular portion and the outside peripheral face of the second mounting member in a circumferential direction.

4 Claims, 6 Drawing Sheets

U.S. PATENT DOCUMENTS

| | | | |
|---|---|---|---|
| 7,946,561 B2* | 5/2011 | Nemoto et al. | 267/140.14 |
| 8,016,274 B2* | 9/2011 | Adams | 267/140.13 |
| 2001/0019099 A1* | 9/2001 | Okanaka et al. | 248/562 |
| 2001/0032919 A1* | 10/2001 | Hagino et al. | 248/562 |
| 2002/0047080 A1* | 4/2002 | Guillemot | 248/562 |
| 2006/0066016 A1* | 3/2006 | Hasegawa et al. | 267/140.13 |
| 2006/0091281 A1* | 5/2006 | Miyahara et al. | 248/636 |
| 2006/0157633 A1* | 7/2006 | Bellamy et al. | 248/562 |
| 2006/0220289 A1* | 10/2006 | Okumura et al. | 267/140.13 |
| 2007/0013115 A1 | 1/2007 | Katagiri et al. | |
| 2008/0054152 A1* | 3/2008 | Maeno et al. | 248/562 |
| 2009/0001639 A1* | 1/2009 | Muraoka et al. | 267/140.13 |
| 2009/0026671 A1* | 1/2009 | Kojima et al. | 267/121 |
| 2009/0243171 A1* | 10/2009 | Nanno et al. | 267/140.13 |

* cited by examiner

FLUID-FILLED TYPE VIBRATION DAMPING DEVICE

INCORPORATED BY REFERENCE

The disclosure of Japanese Patent Application No. 2010-043404 filed on Feb. 26, 2010 including the specification, drawings and abstract is incorporated herein by reference in its entirety.

BACKGROUND OF THE INVENTION

1. Field of the Invention The present invention relates generally to a fluid-filled type vibration damping device capable of generating vibration damping effect utilizing a non-compressible fluid sealed therein. More particularly, the present invention pertains to a fluid-filled type vibration damping device which is furnished with a resin bracket.

2. Description of the Related Art

Fluid-filled type vibration damping devices are known as one type of damping connectors or damping supports adapted to be mounted between components that make up a vibration transmission system. Such devices utilize flow behavior or the like of a non-compressible fluid sealed therein so as to obtain vibration damping effect, in addition to vibration damping effect owing to a rubber elastic body. One example of these vibration damping devices comprises a first mounting member and a tubular second mounting member connected by a main rubber elastic body, a fluid chamber whose wall is partially defined by the main rubber elastic body and surrounded by the tubular second mounting member, and a non-compressible fluid sealed within the fluid chamber.

Such a fluid-filled type vibration damping device is installed by the first mounting member and the second mounting member being attached respectively to components to be provided with vibration damped linkage. For example, in a vehicle-use engine mount that serves as a fluid-filled type vibration damping device, a first mounting member is attached to a power unit while a second mounting member is attached to a vehicle body, thereby providing vibration damping support of the power unit on the vehicle body.

Here, a bracket has been employed as a separate element that is adapted to be secured onto the outside peripheral face of the second mounting member for attaching the tubular second mounting member to the component to be provided with vibration damped linkage such as the vehicle body or the like. While a metal bracket has been used as the separate bracket to date, in recent years, employing a resin bracket has been contemplated because of the growing needs of vehicles reduced in weight.

For example, Japanese Unexamined Patent Publication No. JP-A-6-234134 discloses a technique wherein a main rubber of the vibration damping device has been formed by vulcanization molding in advance, the main rubber is set in a resin mold for injection molding of a resin so as to produce a resin bracket of the device, and the resin bracket and the main rubber are bonded to each other utilizing pressure and heat during the injection molding. However, for bonding the resin bracket directly to the main rubber in this way, it is necessary to perform an adhesive treatment (apply an adhesive) on the surface of the main rubber. This will pose a problem of increasing production cost for the adhesive as well as the number of steps for applying the adhesive.

In order to address this problem, Japanese Unexamined Patent Publication No. JP-A-2001-50331 proposed a construction in which a second mounting member is furnished with annular projections on its outside peripheral face at two or more sections spaced apart from one another in the axial direction. The second mounting member is subjected to an insert molding with a resin bracket so that the annular projections are inserted into and pinched by the resin bracket, thereby obtaining bond strength without increase in production cost for the adhesive as well as the number of steps for applying the adhesive. However, with the construction wherein the two or more annular projections are inserted into the resin bracket in this way, residual stress tends to be generated in the resin portion clasped between the annular projections. Thus, strength or durability as a resin bracket is likely to be deteriorated.

As reasons for this, it is posited that in the resin portion clasped between the upper and lower annular projections in the axial direction, which includes most of the resin portion of the resin bracket in the axial direction, the upper and lower annular projections will inhibit the resin from shrinkage after the injection molding. Appreciable residual stress will be generated thereby, posing a risk that strength or durability as a resin bracket may be deteriorated and hence cracking may occur.

Another problem is that since the lower annular projection of the second mounting member has U-shaped contours bent by 180 degrees, which is more complicated structure than that of the upper annular projection, increase in production cost by a corresponding amount will be inevitable. Moreover, there is another inherent problem that because the entireties of the upper and lower annular projections of the second mounting member are covered by the resin portion so as to be embedded therein, a large volume of resin will be required in order to cover the axially outside of the annular projections as well, inevitably causing increased weight.

SUMMARY OF THE INVENTION

It is therefore one object of this invention to provide a fluid-filled type vibration damping device of novel construction which is able to realize a resin bracket capable of preventing occurrence of deformation or the like due to stress while achieving reduced weight and lower cost.

One mode of the present invention provides a fluid-filled type vibration damping device comprising: a first mounting member; a tubular second mounting member; a main rubber elastic body connecting the first and second mounting members; a fluid chamber whose wall is partially defined by the main rubber elastic body and filled with a non-compressible fluid; a mating groove opening in an outside peripheral face of the second mounting member while extending in a circumferential direction; and a resin bracket fabricated on the outside peripheral face of the second mounting member, the resin bracket including: a mating portion mated within the mating groove of the second mounting member; a mating tubular portion extending on the outside peripheral face of the second mounting member from the mating portion to one axial side; a mounting portion which is formed at a distal end portion of the mating tubular portion on the one axial side and extends peripherally outward; and a weight reducing space opening at a distal end face of the mating tubular portion on the one axial side while extending between an inside peripheral face of the mating tubular portion and the outside peripheral face of the second mounting member in the circumferential direction.

With the fluid-filled type vibration damping device constructed according to the present invention, through an insert molding of the second mounting member, the mating portion of the resin bracket is securely mated within the mating groove of the second mounting member. In addition, the mating tubular portion integrally formed with the mating portion also exhibits mating force with respect to the tubular outside peripheral face of the second mounting member. Accordingly, the mating force of both the mating portion and the mating tubular portion with respect to the second mounting member will firmly secure the resin bracket onto the second mounting member.

Moreover, in this resin bracket, the mating portion secured to the second mounting member and the mounting portion secured to the component to be provided with vibration damped linkage are separated from each other via the mating tubular portion. With this arrangement, fastening force with respect to the component to be provided with vibration damped linkage acting on the mounting portion and fastening force with respect to the second mounting member acting on the mating portion will be dispersed to each other, thereby reducing or avoiding intensive action on a specific region. Furthermore, the weight reducing space is provided between the mating tubular portion and the outside peripheral face of the second mounting member. Accordingly, the resin bracket is allowed deformation to some extent by the weight reducing space, achieving reduction and dispersion of the stress.

Therefore, the fluid-filled type vibration damping device according to the present invention will sufficiently ensure fastening force of the resin bracket onto the second mounting member owing to both of the mating portion and the mating tubular portion, as well as avoid stress concentration due to the external load etc. owing to the mating tubular portion furnished with the weight reducing space. Furthermore, there is no such problem as occurred to the conventional construction which the aforementioned JP-A-2001-50331 discloses, namely, the problem that the resin portion clasped between the annular projections provided to the second mounting member is inhibited from shrinkage after the injection molding thereby generating appreciable residual stress. Consequently, cracking or the like of the resin bracket will be avoided, making it possible to effectively obtain strength and durability of the resin bracket.

In another preferred mode of the fluid-filled type vibration damping device constructed according to the present invention, the first mounting member is disposed so as to be spaced apart from a first axial open end of the second mounting member; the mating groove is formed at the first axial open end of the second mounting member; a flange portion extending peripherally outward is integrally formed with an edge of the first axial open end of the second mounting member; and the flange portion is held in contact against an axial end face of the mating portion of the resin bracket which is mated within the mating groove.

By providing the flange portion to the second mounting member so as to be supported by the resin bracket in this way, more improved fastening force of the resin bracket with respect to the second mounting member can be attained.

In yet another preferred mode of the fluid-filled type vibration damping device constructed according to the present invention, the first mounting member is disposed so as to be spaced apart from a first axial open end of the second mounting member; the mating groove is formed at the first axial open end of the second mounting member; a stopper protrusion extending peripherally outward is integrally formed with an edge of the first axial open end of the second mounting member; a stopper support portion extending peripherally outward is integrally formed with an axial end of the mating portion of the resin bracket which is mated within the mating groove; and the stopper protrusion is held in contact against the stopper support portion.

With the stopper protrusion provided to the second mounting member, it is possible to realize a stopper mechanism for limiting an amount of relative displacement of the first mounting member and the second mounting member through a simple structure. Moreover, by reinforcing the stopper protrusion with the stopper support portion provided to the resin bracket, load bearing capability of the stopper mechanism will be efficiently improved without any increase in special components or manufacturing processes.

In yet another preferred mode of the fluid-filled type vibration damping device constructed according to the present invention, the first mounting member is disposed so as to be spaced apart from a first axial open end of the second mounting member; and the mating groove of the second mounting member comprises a first sloping inner face and a second sloping inner face which respectively extend in axially either side, and the first sloping inner face which extends toward the first axial open end of the second mounting member has a greater length in a sloping direction than does the second sloping inner face, while the second sloping inner face has a greater sloping angle than does the first sloping inner face.

In this way, the first sloping inner face of the mating groove of the second mounting member is imparted a greater length in the sloping direction. This makes it possible to ensure fastening area with respect to the main rubber elastic body, and concomitantly to ensure pressure-receiving area of the second mounting member on which vibration load is adapted to be exerted via the main rubber elastic body. Accordingly, enduring performance and load bearing capability, and hence vibration damping ability will be improved. Also, by imparting a greater sloping angle to the second sloping inner face of the mating groove, it is possible to avoid an increase in axial size of the second mounting member and hence of the vibration damping device, while making it possible to efficiently position the resin bracket (mating portion) with respect to the mating groove (namely, to obtain resistance to dislodgement toward the second axial open end, which is opposite side of the first axial open end).

The fluid-filled type vibration damping device of construction according to the present invention employs the novel specific structure in which the mating portion and the mounting portion are connected by the mating tubular portion while the weight reducing space is provided to the axial end face of the mating tubular portion on the mounting portion side. Therefore, it is possible to sufficiently ensure fastening force of the resin bracket with respect to the second mounting member and concomitantly to avoid stress concentration of the resin bracket, thereby achieving excellent strength and durability.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
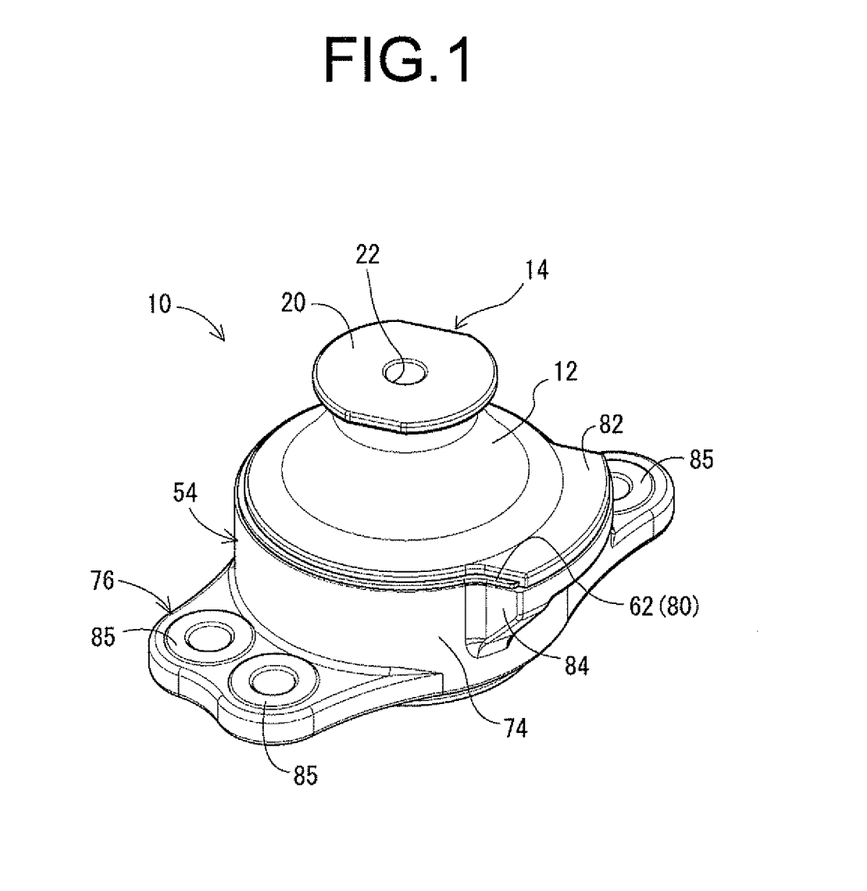
FIG. 1 is a perspective view of a fluid-filled type vibration damping device in the form of an engine mount, which is constructed according to a first embodiment of the present invention.
Figure 2:
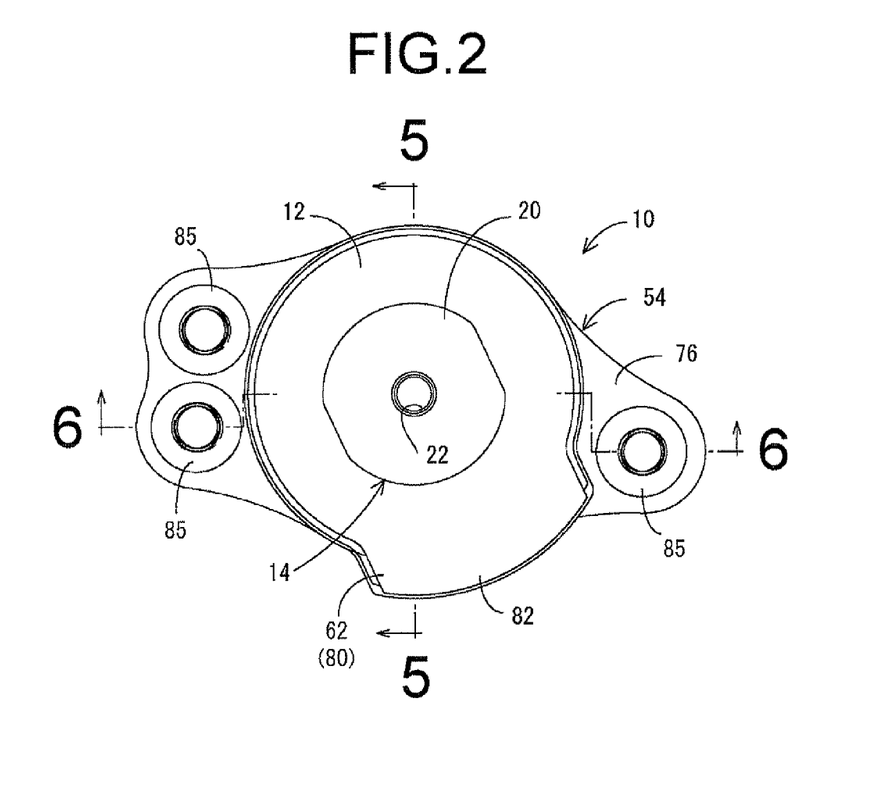
FIG. 2 is a top plane view of the engine mount of FIG. 1.
Figure 3:
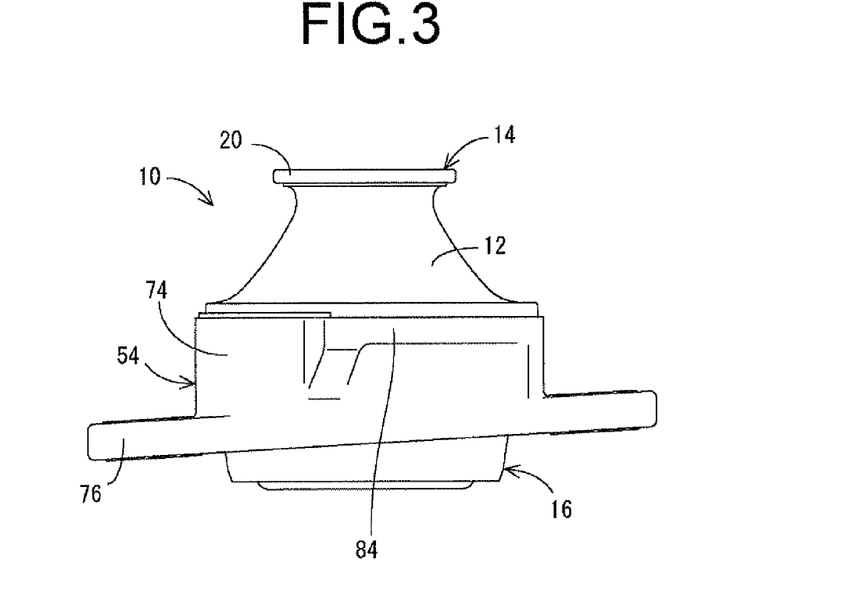
FIG. 3 is a front elevational view of the engine mount of FIG. 1.
Figure 4:
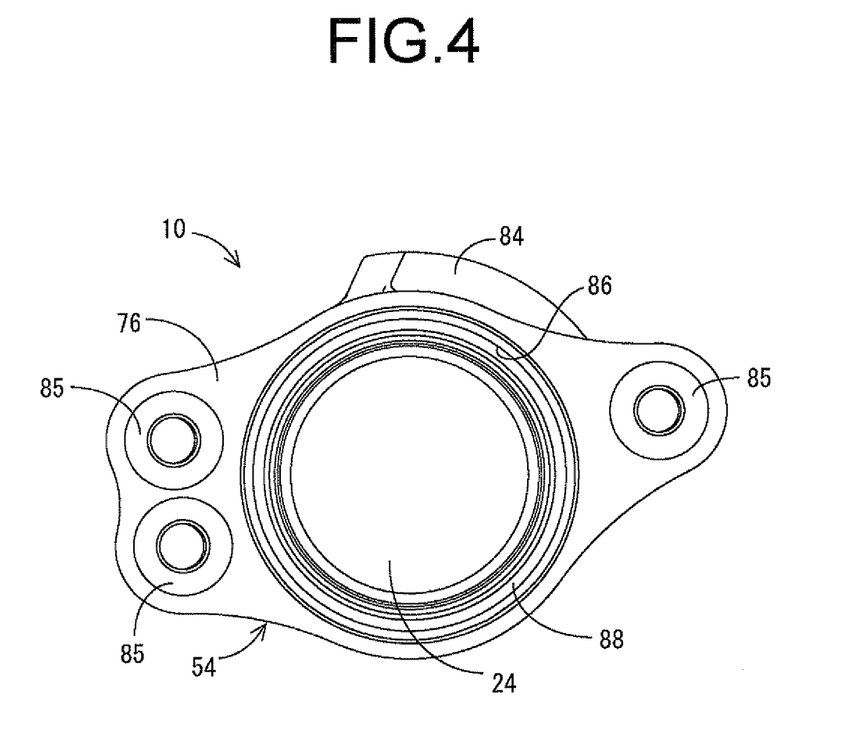
FIG. 4 is a bottom plane view of the engine mount of FIG. 1.
Figure 5:
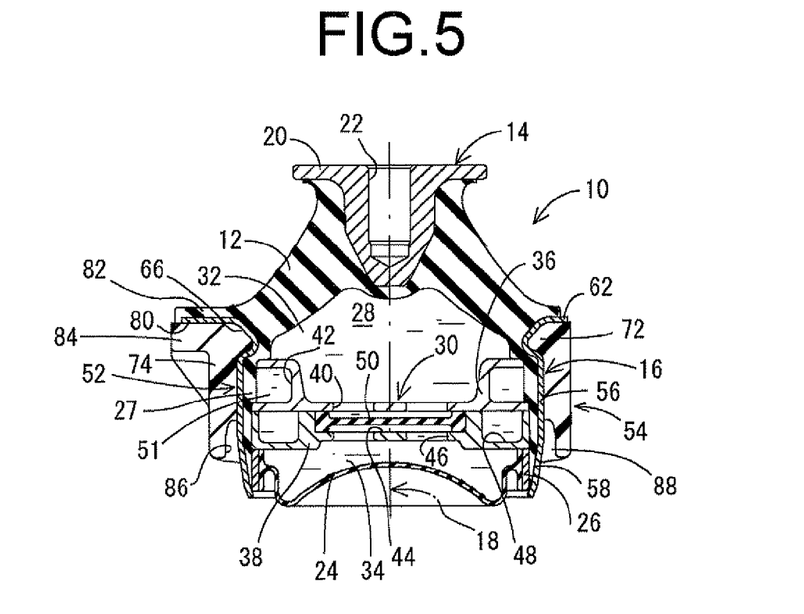
FIG. 5 is a cross sectional view taken along line 5-5 of FIG. 2.
Figure 6:
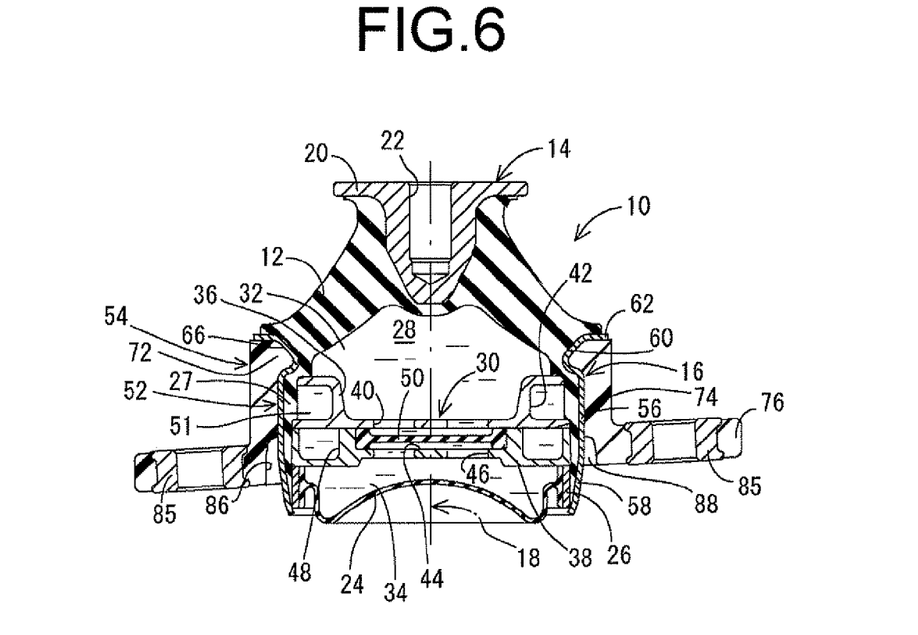
FIG. 6 is a cross sectional view taken along line 6-6 of FIG. 2.

First, FIGS. 1 through 4 depict an automotive fluid-filled type engine mount 10 according to a first embodiment of the present invention. The engine mount 10, as shown in FIGS. 5 and 6 in cross sectional view, is furnished with a first mounting member 14 of metal and a second mounting member 16 of metal elastically connected to each other by a main rubber elastic body 12. The engine mount 10 is adapted to elastically support a power unit with respect to a vehicle body in a rested state, with the power unit mounted onto the first mounting member 14 and with the vehicle body mounted onto the second mounting member 16. FIGS. 1 through 6 depict the engine mount 10 prior to installation on which no external load is exerted; the engine mount 10 is adapted to be installed in a vehicle with the vertical direction in FIGS. 3, 5 and 6 generally aligned with vertical direction.

Described more specifically, the first mounting member 14 is of round block shape which extends along a mount center axis 18 (see FIGS. 5 and 6) with a round cross section. The axially lower end of the first mounting member 14 has a tapering inverted frustoconical shape while the axially upper end thereof has a flange-shaped rimming portion 20 integrally formed therewith. The first mounting member 14 includes a female thread hole 22 for attachment which opens onto the upper end face thereof. On the other hand, the second mounting member 16 is of large-diameter, generally round tubular shape. The first mounting member 14 is disposed so as to be spaced apart from the upper open end, namely, the first axial open end of the second mounting member, whereby the first mounting member 14 and the second mounting member 16 are placed in a concentric fashion along the mount center axis 18. Meanwhile, the main rubber elastic body 12 has a thick, generally tapered cylindrical shape or hollow frustoconical shape which opens downward. The inside peripheral face of the small-diameter end of the main rubber elastic body 12 is bonded by vulcanization to the outside peripheral face of the first mounting member 14 and the lower face of the rimming portion 20; on the other hand, the outside peripheral face of the large-diameter end of the main rubber elastic body 12 is bonded by vulcanization to the inside peripheral face of the upper opening portion of the of the second mounting member 16. With this arrangement, the first mounting member 14 is elastically connected to the upper opening portion of the second mounting member 16 by means of the main rubber elastic body 12.

That is, in the present embodiment, the main rubber elastic body 12 takes the form of an integrally vulcanization molded component incorporating the first mounting member 14 and the second mounting member 16, and the upper opening of the second mounting member 16 is covered fluid-tightly by the main rubber elastic body 12.

On the other hand, to the lower opening of the second mounting member 16, a diaphragm 24 is attached. The diaphragm 24 is formed by a thin-walled rubber elastic film so as to be readily elastically deformable. To the outer peripheral edge of the diaphragm 24, an annular assembly fitting 26 is bonded by vulcanization. The assembly fitting 26 is detained by caulking against the lower opening of the second mounting member 16 with a seal rubber layer 27 clamped therebetween, whereby the lower opening of the second mounting member 16 is covered fluid-tightly by the diaphragm 24.

With this arrangement, the main rubber elastic body 12 and the diaphragm 24 respectively cover the two axial end openings of the second mounting member 16. Between the opposed faces of the main rubber elastic body 12 and the diaphragm 24 fluid-tightly isolated from the outside space is formed a fluid chamber 28 in which a non-compressible fluid is sealed. The fluid chamber 28 is filled with a non-compressible fluid such as water, an alkylene glycol or the like.

A partition member 30 is housed within and attached to the fluid chamber 28. The partition member 30 has a generally circular disk shape overall and mated so as to be secured to the inside peripheral face of the second mounting member 16 with the seal rubber layer 27 clamped therebetween. The fluid chamber 28 is thereby bifurcated into top and bottom parts by the partition member 30. To the upper side of the partition member 30 there is defined a pressure-receiving chamber 32 whose wall is partly constituted by the main rubber elastic body 12. Meanwhile, to the lower side of the partition member 30 there is defined an equilibrium chamber 34 whose wall is partly constituted by the diaphragm 24.

The partition member 30 includes an upper partition plate 36 and a lower partition plate 38 superposed against each other. The upper partition plate 36 has a generally circular disk shape and a plurality of communication holes 40 are formed in its center section. At the outer peripheral edge of the upper partition plate 36 there is formed an upper circumferential groove 42 which opens in its outside peripheral face and extends a predetermined length in the circumferential direction. Meanwhile, the lower partition plate 38 has a generally circular disk shape with its outside diameter approximately the same as that of the upper partition plate 36. In the center section of the lower partition plate 38 there is formed a housing recess 44 of circular shape opening upward, and a plurality of communication holes 46 are formed in the base wall of the housing recess 44. At the outer peripheral edge of the lower partition plate 38 there is formed a lower circumferential groove 48 which opens upward and extend a predetermined length in the circumferential direction.

With the upper and lower partition plates 36, 38 superposed against each other, the housing recess 44 of the lower partition plate 38 is covered by the upper partition plate 36, so that a movable rubber film 50 is accommodated therein. The movable rubber film 50 is an elastic rubber plate of circular disk shape having an annular thick portion formed at its outer peripheral edge. With the annular thick portion clasped between the upper and lower partition plates 36, 38, the movable rubber film 50 is disposed such that its center section is elastically deformable in the plate thickness direction within the housing recess 44. In this way, pressure of the pressure-receiving chamber 32 and the equilibrium chamber 34 respectively exert on the front and back faces of the movable rubber film 50 through the communication holes 40, 46. With this arrangement, minute pressure fluctuations in the pressure-receiving chamber 32 during input of vibration will be absorbed on the basis of elastic deformation of the movable rubber film 50, thereby providing a liquid pressure absorption mechanism for enhancing vibration damping ability of high-frequency, small-amplitude vibration.

In the outside peripheral portions of the upper and lower partition plates 36, 38 superposed against each other, circumferential direction passages respectively formed by the upper circumferential groove 42 and the lower circumferential groove 48 are connected in series so as to communicate with each other. With this arrangement, in the outside peripheral portion of the partition member 30 there is formed an orifice passage 51 which extends for a length equal to once around the circumference or more; and the orifice passage 51 connects the pressure-receiving chamber 32 and the equilibrium chamber 34 with each other. The orifice passage 51 is tuned to low-frequency, large-amplitude vibration corresponding to, for example, engine shake or the like. This makes it possible to exhibit vibration damping effect against the low-frequency, large-amplitude vibration on the basis of resonance action of the fluid flowing through the orifice passage 51.

In this way, a mount body 52 is provided such that the first mounting member 14 and the second mounting member 16 are elastically connected to each other by the main rubber elastic body 12 and the fluid chamber 28 is formed in the interior. Furthermore, a resin bracket 54 is mounted onto the outside peripheral face of the second mounting member 16 of the mount body 52. The mount body 52 is arranged such that the first mounting member 14 is secured and attached to the power unit (not shown) by utilizing the female thread hole 22 while the second mounting member 16 is secured and attached to the vehicle body (not shown) via the resin bracket 54, thereby providing vibration damping support of the power unit on the vehicle body.

Here, the second mounting member 16 is furnished with a tubular section 56 positioned in the axial medial section thereof and extending in the axial direction with a generally unchanging diameter dimension. Axially below the tubular section 56 is provided a reduced-diameter mating section 58 that is subjected to a drawing operation so as to have tapered contours and be secured fitting around the outside peripheral face of the assembly fitting 26. Meanwhile, axially above the tubular section 56 is provided a constricted section 60 reduced in diameter. The constricted section 60 includes a flange portion 62 that is integrally formed with its opening end edge and flares diametrically outward.

Figure 7:
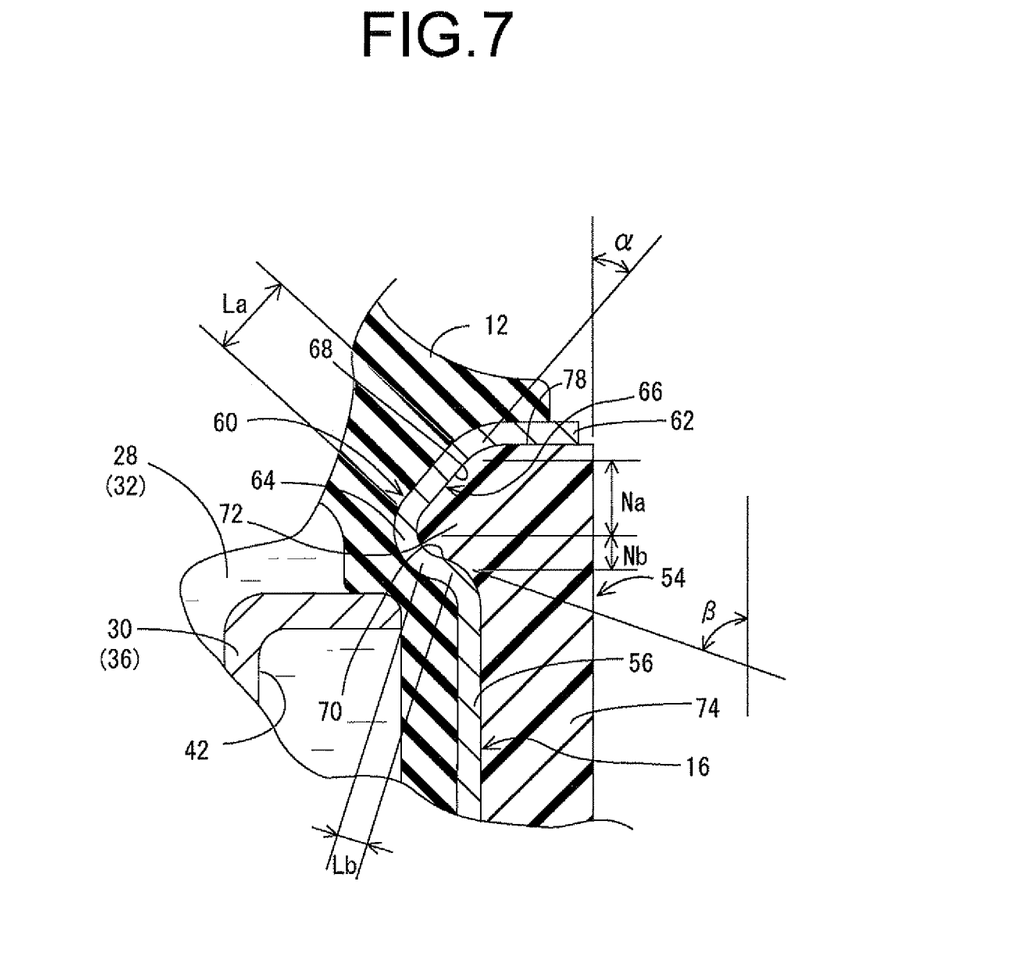
FIG. 7 is an enlarged cross sectional view of a mating portion of a resin bracket of FIG. 5.

As shown by an enlarged cross sectional view in FIG. 7, the constricted section 60 has a groove structure extending continuously about the entire circumference in the circumferential direction with generally V-shaped or generally flared U-shaped cross section that progressively flares out towards axially either side from a smallest-diameter section 64, which has the smallest diameter dimension, and opens onto the outside peripheral face of the second mounting member 16. The constricted section 60 thereby defines an annular mating groove 66 that opens onto the outside peripheral face of the second mounting member 16 and extends in the circumferential direction.

The mating groove 66 comprises first and second sloping inner faces 68, 70 extending in axially either side; the first sloping inner face 68 extends from the smallest-diameter section 64 towards the flange portion 62 (axially upward, namely, towards the first axial open end) while the second sloping inner face 70 extends from the smallest-diameter section 64 towards the tubular section 56 (axially downward). The first and second sloping inner faces 68, 70 differ in shape from each other. Specifically, the sloping angle: a of the first sloping inner face 68 is smaller than the sloping angle: β of the second sloping inner face 70.

With this arrangement, the length: La of the first sloping inner face 68 in the sloping direction is greater than the length: Lb the second sloping inner face 70 in the sloping direction. The first sloping inner face 68 which mainly receives loads exerted via the main rubber elastic body 12 is thereby able to ensure sufficient pressure-receiving area and bonding area of the main rubber elastic body 12, providing enhanced durability and load bearing capability. Concomitantly, the axial dimension: Nb of the second sloping inner face 70 is made smaller than the axial dimension: Na of the first sloping inner face 68. Accordingly, the bonding area or the like of the first sloping inner face 68 to the main rubber elastic body 12 is sufficiently ensured while the axial length of the second mounting member 16 is kept to a minimum.

In the presence of the above-described mount body 52, the resin bracket 54 is molded onto the outside peripheral face of the second mounting member 16, whereby the second mounting member 16 is molded with the resin bracket 54 through an insert molding. This provides the resin bracket 54 with a mating portion 72 that is inserted into and secured mating with the mating groove 66 of the second mounting member 16 in a state of intimate contact, and a mating tubular portion 74 that extends axially downward from the mating portion 72 and attached fitting around the outside peripheral face of the tubular section 56 of the second mounting member 16 in a state of intimate contact. Moreover, at the lower end portion of the mating tubular portion 74, namely, at the extending distal end portion of the mating tubular portion 74 that extends from the mating portion 72 in the axial direction is formed a mounting portion 76 of generally annular disk shape that flares towards the outer peripheral side.

The outside peripheral face extending from the mating portion 72 to the mating tubular portion 74 defines a round tubular outside peripheral face having generally unchanging diameter. Meanwhile, the flange portion 62 of the second mounting member 16 is superposed in a state of intimate contact against an axial upper end face 78 of the mating portion 72 over the entire face thereof. The flange portion 62 extends partially along a circumference towards the outer peripheral side so as to integrally form a stopper protrusion 80 which functions in a bound direction. A cushioning rubber 82 is formed so as to cover the stopper protrusion 80 while a stopper support portion 84, which is arranged to be superposed in a state of intimate contact against the lower face of the stopper protrusion 80, is integrally formed with the axial end of the mating portion 72 so as to flare peripherally outward from the outside peripheral face of the resin bracket 54. With this arrangement, a bound stopper mechanism is provided for limiting in cushioned fashion an amount of elastic deformation of the main rubber elastic body 12 in the bound direction urging the first mounting member 14 and the second mounting member 16 relatively closer to each other due to strike of an abutting part of the power unit (not shown) against the stopper protrusion 80. Besides, ring-shaped fastener fittings 85 are inserted into multiple locations along the circumference (three locations in the present embodiment) of the mounting portion 76. By means of fastening bolts or the like being inserted into the fastener fittings 85, the resin bracket 54 is adapted to be secured to the vehicle body (not shown).

Furthermore, a gouge-like weight reducing hole 86 is provided at the axially lower end portion of the mating tubular portion 74 so as to flare the inside peripheral face thereof. In the present embodiment, the weight reducing hole 86 has a depth dimension approximately the same as the thickness dimension of the mounting portion 76 while having an opening dimension in the diametrical direction approximately one-half of the thickness dimension of the mating tubular portion 74. Accordingly, the weight reducing hole 86 defines a weight reducing space 88 between the second mounting member 16 and the mating tubular portion 74 that opens at the axially lower end face of the mating tubular portion 74 while extending in the circumferential direction. Whereas the weight reducing space 88 may be partially segmented in the circumferential direction, in the present embodiment, it extends continuously about the entire circumference in the circumferential direction with an annular shape. Also, the weight reducing space 88 has a flared cross sectional profile slightly flaring out towards the axially lower end (opening end) thereof, and extends out so that its opening end passes the tubular section 56 of the second mounting member 16 and reaches the reduced-diameter mating section 58.

In the engine mount 10 according to the present embodiment where the resin bracket 54 is secured fitting with the second mounting member 16 of the mount body 52 in this way, the mating portion 72 of the resin bracket 54 is secured mating with the mating groove 66 of the second mounting member 16. In addition, the mating tubular portion 74 of the resin bracket 54 is secured mating with the tubular section 56 of the second mounting member 16. With this arrangement, the resin bracket 54 is able to be firmly secured mating with the second mounting member 16. In particular, with the mating portion 72 inserted into the mating groove 66, the resin bracket 54 can effectively exhibit fastening force with respect to the second mounting member 16 in the axial direction. Meanwhile, with the mating tubular portion 74 fitted externally onto the tubular section 56, the resin bracket 54 can effectively exhibit fastening force with respect to the second mounting member 16 in the prizing or twisting direction and in the axis-perpendicular direction. Therefore, both the mating portion 72 and the mating tubular portion 74 will synergistically exhibit mating and fastening force with respect to the second mounting member 16, making it possible to firmly secure the resin bracket 54 to the second mounting member 16.

Besides, the resin bracket 54 has no structure adapted to pinch the flange portion 62 of the second mounting member 16 (see JP-A-2001-50331). Instead, in the resin bracket 54, the mating action of the thick mating portion 72 with the mating groove 66 as well as the mating action of the thick mating tubular portion 74 externally onto the tubular section 56 enable the resin bracket 54 to exhibit fastening force with respect to the second mounting member 16. Accordingly, the resin bracket 54 will be subjected to less stress concentration than the structure as taught in JP-A-2001-50331 that pinches the annular projections of the second mounting member, whereby the resin bracket 54 is able to achieve enhanced durability and load bearing capability.

Additionally, it should be noted that the resin bracket 54 includes the mating tubular portion 74 between the mating portion 72 mated with the second mounting member 16 and the mounting portion 76 adapted to be secured to the vehicle body. Accordingly, an external load input from the power unit to the mating portion 72 via the main rubber elastic body 12 and an external load input from the vehicle body to the mounting portion 76 will be dispersed to each other owing to presence of the mating tubular portion 74 interposed therebetween, thereby reducing stress concentration on a specific region. Moreover, the mating tubular portion 74 is allowed deformation to some extent owing to presence of the weight reducing space 88 provided between the mating tubular portion 74 and the outside peripheral face of the second mounting member 16, thereby achieving reduction and further dispersion of the stress.

In particular, the engine mount 10 according to the present embodiment is free from the problem inherent in JP-A-2001-50331. That is, with the structure as taught in JP-A-2001-50331, the annular projections are provided to the outside peripheral face of the second mounting member at the multiple locations in the axial direction, and are respectively inserted into the resin bracket to be axially secured thereto. Therefore, the resin portion clasped between the annular projections is inhibited from shrinkage after the injection molding. In the engine mount 10, on the other hand, it is possible to prevent appreciable residual stress due to shrinkage of the resin bracket 54 during molding, thereby avoiding deterioration of strength or durability as a resin bracket. Thus, the resin bracket 54 never suffers from the problem of occurrence of cracking or the like. As will be appreciated from the above description, the resin bracket 54 is secured to the second mounting member 16 at only one location in the axial direction with the mating portion 72, which is provided to axially upper end portion of the resin bracket 54. Accordingly, even if change in component dimensions of the resin bracket 54 and the second mounting member 16 is induced relative to each other because of difference in coefficients of thermal expansion during temperature changes, effect of reducing occurrence of stress in the resin bracket 54 can be afforded.

Therefore, the engine mount 10 constructed in the above manner is capable of: sufficiently ensuring fastening force of the resin bracket 54 with respect to the second mounting member 16 owing to both the mating portion 72 and the mating tubular portion 74; avoiding stress concentration due to external load or the like, owing to presence of the mating tubular portion 74 furnished with the weight reducing space 88; and preventing appreciable residual stress due to inhibition of shrinkage of the resin by interference of the annular projections after the injection molding so as to avoid cracking or the like in the resin bracket 54, thereby effectively obtaining strength and durability of the resin bracket 54. As a result, it is possible to realize the engine mount 10 that affords sufficient load bearing capability and durability at practical levels while employing a resin bracket. Additionally, unlike the structure disclosed in JP-A-2001-50331, the second mounting member 16 does not include any lower annular projection having U-shaped contours bent by 180 degrees. Besides, the axially outside of the annular projection (namely flange portion 62) is not covered with resin. Thus, the engine mount 10 is constructed with consideration to lighter weight and reduced cost.

It should be noted that, in the above-described embodiment, it is not necessary to provide the bound stopper mechanism including the stopper protrusion 80 integrally formed with the flange portion 62 of the second mounting member 16. It is also acceptable to practice the present invention according to a mode in which the flange portion 62 is not provided.

Figure 8:
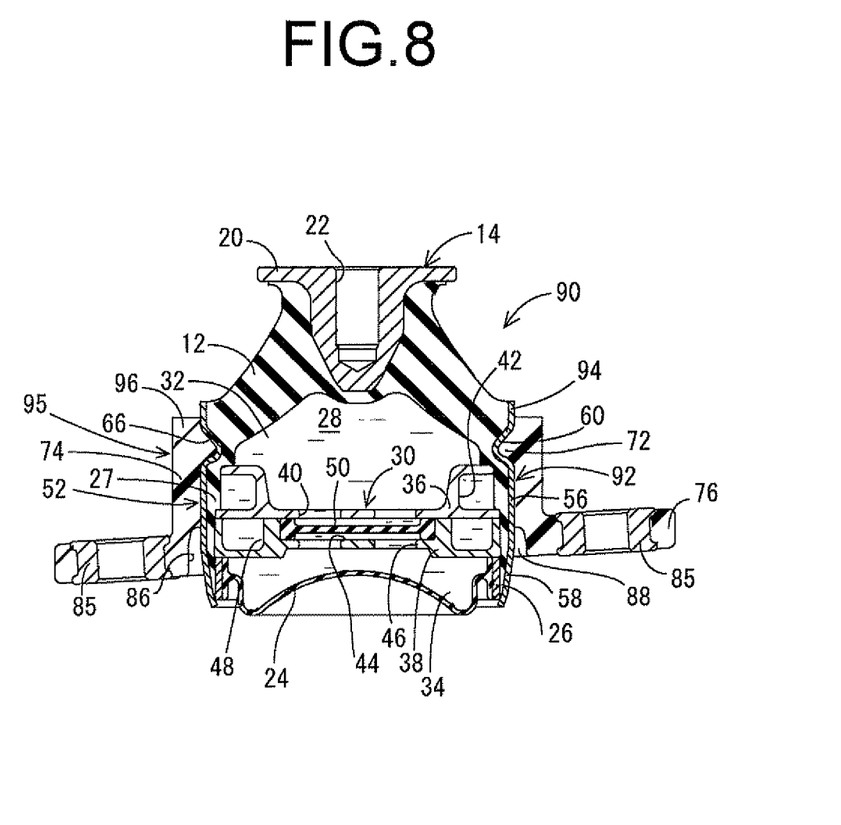
FIG. 8 is an elevational view in axial or vertical cross section of an engine mount according to a second embodiment of the present invention.

Specifically, FIG. 8 depicts an engine mount 90 according to a second embodiment of the present invention. As depicted, it would be possible that a second mounting member 92 of circular cylinder shape includes the constricted section 60 at its axially medial section. That is, the second mounting member 92 is furnished with an extended tubular section 94 that extends out from the upper opening edge of the constricted section 60 (namely, the mating groove 66) farther towards the top in the axial direction so as to have a tubular shape. Similarly, the resin bracket 95 includes an extended mating tubular portion 96 integrally formed therewith and extending out from the mating portion 72 farther towards the top in the axial direction. Accordingly, at the axially both sides of the mating portion 72 secured mating with the mating groove 66 (second mounting member 16), the mating tubular portion 74 is secured mating with the tubular section 56 while the extended mating tubular portion 96 is secured mating with the extended tubular section 94, whereby the resin bracket 95 is firmly secured to the second mounting member 16. However, the extended tubular section 94 of the second mounting member 16 and the extended mating tubular portion 96 of the resin bracket 95 are not essential in the present invention; the axially upper end portion of the second mounting member 16 may be defined by the upper end edge of the constricted section 60 of the second mounting member 16. To facilitate understanding, in FIG. 8, members and regions having the same structure as in the preceding first embodiment have been assigned identical symbols.

As will be apparent from the above description, the present invention features the structure for attaching the resin bracket to the tubular second mounting member, and no particular limitation is imposed as to the specific structure of the mount body. For example, it would also be acceptable to provide a plurality of orifice passages tuned to mutually different frequency ranges. Moreover, the present invention is adaptable to implementation in fluid-filled type active vibration damping devices that actively control pressure within a fluid chamber through actuation of an oscillation plate by means of a pneumatic actuator or an electromagnetic actuator. Furthermore, the present invention is also adaptable to implementation in devices such as fluid-filled type vibration damping devices of suspension design in which a first mounting member is disposed to the lower opening end of a second mounting member so as to be spaced apart therefrom, and with a power unit mounted onto the first mounting member while the second mounting member mounted onto a vehicle body, the power unit will be supported in vibration-damped fashion on the vehicle body by being suspended therefrom.

What is claimed is:

1. A fluid-filled type vibration damping device comprising:
   a first mounting member;
   a tubular second mounting member of metal;
   a main rubber elastic body connecting the first and second mounting members;
   a fluid chamber whose wall is partially defined by the main rubber elastic body and filled with a non-compressible fluid;
   a mating groove opening in an outside peripheral face of the second mounting member while extending in a circumferential direction; and
   a resin bracket molded onto the outside peripheral face of the second mounting member through an insert molding, wherein:
   the resin bracket includes a mating portion mated within the mating groove of the second mounting member, a mating tubular portion extending on the outside peripheral face of the second mounting member from the mating portion to one axial side, and a mounting portion which is formed at a distal end portion of the mating tubular portion on the one axial side and extends peripherally outward;
   a weight reducing space opens at a distal end face of the mating tubular portion on the one axial side while extending between an inside peripheral face of the mating tubular portion and the outside peripheral face of the second mounting member in the circumferential direction;
   the first mounting member is disposed so as to be spaced apart from a first axial open end of the second mounting member; and
   the mating groove of the second mounting member comprises a first sloping inner face and a second sloping inner face which respectively extend axially in opposite directions, and the first sloping inner face which extends toward the first axial open end of the second mounting member has a greater length in a sloping direction than does the second sloping inner face, while the second sloping inner face has a greater sloping angle than does the first sloping inner face.

2. The fluid-filled type vibration damping device according to claim 1, wherein:
   the first mounting member is disposed so as to be spaced apart from a first axial open end of the second mounting member;
   the mating groove is formed at the first axial open end of the second mounting member;
   a flange portion extending peripherally outward is integrally formed with an edge of the first axial open end of the second mounting member; and
   the flange portion is held in contact against an axial end face of the mating portion of the resin bracket which is mated within the mating groove.

3. The fluid-filled type vibration damping device according to claim 1, wherein:
   the first mounting member is disposed so as to be spaced apart from a first axial open end of the second mounting member;
   the mating groove is formed at the first axial open end of the second mounting member;
   a stopper protrusion extending peripherally outward is integrally formed with an edge of the first axial open end of the second mounting member;
   a stopper support portion extending peripherally outward is integrally formed with an axial end of the mating portion of the resin bracket which is mated within the mating groove; and
   the stopper protrusion is held in contact against the stopper support portion.

4. The fluid-filled type vibration damping device according to claim 1, wherein:
   the first mounting member is disposed so as to be spaced apart from a first axial open end of the second mounting member;
   the mating groove is formed at the first axial open end of the second mounting member;
   the second mounting member includes an extended tubular section extending out from the mating groove farther towards the first axial open end of the second mounting member; and
   the resin bracket includes an extended mating tubular portion integrally formed therewith and extending out from the mating portion farther towards the first axial open end of the second mounting member, so that the resin bracket is secured to the second mounting member at axially both sides of the mating portion.

* * * * *